United States Patent Office 2,875,738
Patented Mar. 3, 1959

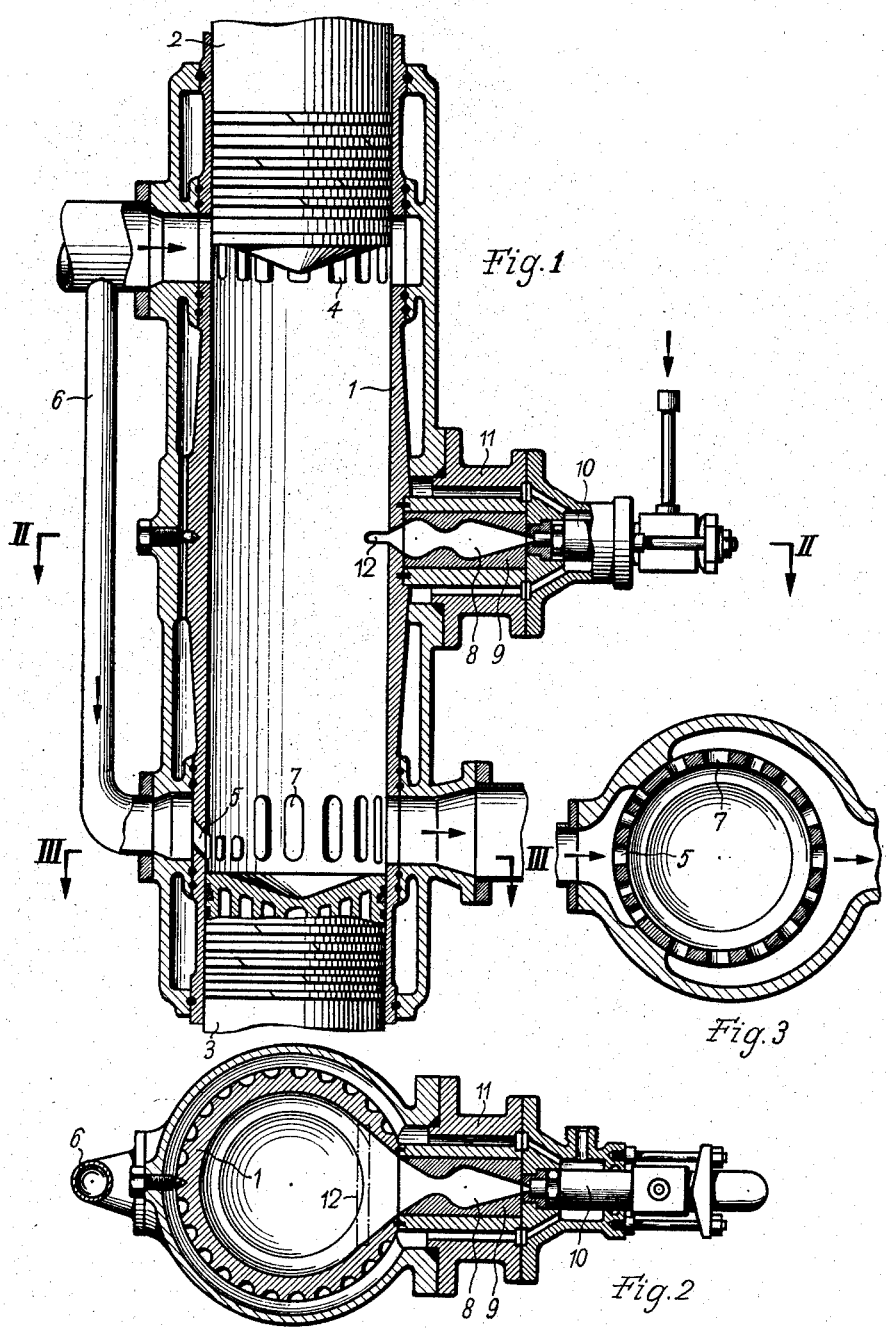

2,875,738

TWO-STROKE CYCLE INTERNAL COMBUSTION ENGINE WITH OPPOSED PISTONS

Hermann Rieseler, deceased, late of Neidlingen (Teck), Germany, by Helene Rieseler, née Scherber, heir, Neidlingen (Teck), Germany Application May 19, 1955, Serial No. 509,589
In Germany October 13, 1948

Public Law 619, August 23, 1954
Patent expires October 13, 1968

3 Claims. (Cl. 123—51)

The invention concerns a superchargeable two-stroke cycle internal combustion engine with opposed pistons, which is provided with a combustion chamber arranged laterally of the working cylinder and leading thereinto and is furthermore provided with a piston controlling the fuel inlet which piston has an outwardly arched top adapted periodically to be cooled when the air inlet slots are opened. The above mentioned internal combustion engine is furthermore provided with a piston controlling the gas discharge and provided with a top arched inwardly, i. e. provided with a trough-like depression corresponding to the outwardly arching of said other piston.

With internal combustion engines of the above mentioned type, the piston controlling the gas discharge is subjected to a higher thermal stress than the piston controlling the intake of the charging air. This is due to the fact that the piston controlling the gas discharge is even after completion of its working stroke heated by the combustion gases being discharged. The temperature of operation of the discharge control piston is therefore higher than that of the intake control piston and is considerably higher than the piston top temperatures occurring with two-stroke cycle heavy oil motors of customary construction. It is a well known fact that the power output of two-stroke cycle internal combustion engines with opposed pistons can be considerably increased by increasing the fuel and air charge to be fed into the cylinders of such engines per each working cycle. The advantages, however, were obtained at the expense of the compression ratio. In other words, it was necessary to reduce the compression ratio in order to reduce the development of free heat during the combustion of the fuel and it was also necessary to decrease the combustion temperatures, the useful heat drop, and the economy of the engine.

It is, therefore, an object of the present invention to provide a two-stroke cycle internal combustion engine which will overcome the above mentioned drawbacks.

It is another object of this invention to provide a two-stroke cycle internal combustion engine which will make it possible to burn an increased amount of fuel and air with a low excess in air and at a correspondingly high combustion temperature.

It is still another object of this invention to provide a two-stroke cycle internal combustion engine of the type set forth above which will be characterized by a particularly effective cooling.

These and other objects and advantages of the invention will appear more clearly from the following specification in connection with the accompanying drawings, in which:

Fig. 1 illustrates a longitudinal section through a cylinder of an internal combustion engine according to the present invention.

Fig. 2 is a section taken along the line II—II of Fig. 1.

Fig. 3 is a section taken along the line III—III of Fig. 1.

General arrangement

The above mentioned drawbacks have been overcome according to the present invention by a particularly effective cooling. To this end, the air inlet slots provided within the range of the discharge slots are so designed and arranged that they are located within the same longitudinal section in which the discharge slots are located and are arranged exclusively within a circumferential area of the cylinder which area is free from discharge slots and is located opposite the discharge manifold. The said air inlet slots are inclined to the cylinder axis and are directed toward the trough-like depression of the piston controlling the discharge slots when said piston approximately occupies its outer dead center position. These cooling air inlet slots are connected to the scavenging and charging air conduits of the engine and have their longitudinal extension dimensioned and arranged so that they are released by the discharge slot controlling piston at best simultaneously together with the inlet slots. However, the arrangement is such that said cooling air inlet slots will be closed considerably earlier by the discharge controlling piston than the said discharge slots.

Furthermore, a passage leads from the combustion chamber laterally of the working cylinder to said working cylinder. This passage gradually widens and leads into said working cylinder in the form of a small slot so that the said gradually widening passage will not be overlapped by the two pistons when the said pistons occupy their inner dead center position. When the pistons occupy their inner dead center positions, the outwardly arched top of the piston which controls the air inlet extends into the corresponding trough-like depression of the top of the other piston controlling the gas discharge. During the combustion, the flame jet entering the piston working chamber from the lateral combustion chamber is widely distributed and heats the arched top of the piston controlling the air inlet which top is periodically cooled when the inlet slots are being opened.

Structural arrangement

Referring now to the drawing in detail, the arrangement shown therein comprises a cylinder 1 having reciprocably mounted therein the two pistons 2 and 3 which are coupled with each other in the manner well known in connection with oppositely moving pistons. The gas discharge is controlled by the piston 3, whereas the air inlet is controlled by the piston 2. The two pistons are arranged with regard to each other in such a manner that the piston 3 runs ahead of the piston 2 by approximately 20 to 25 degrees. The cylinder 1 is provided with air inlet slots 4 and with one or more slots 5 for admitting cooling air. The cooling air inlet slots 5 communicate with the inlet slots 4 for the scavenging and charging air through the intervention of a connecting conduit 6. The inlet slots 5 for the cooling air are shorter in axial direction of the cylinder 1 than the discharge slots 7. The arrangement is such that the piston 3 controlling the gas discharge will, following the expansion of the gases in cylinder 1, uncover the slots 5 at the end of the working stroke and simultaneously with the uncovering of the inlet slots 4. However, the slots 5 for admitting cooling air will be closed considerably earlier than the inlet slots 4. The additional inlet slots 5 are inclined and arranged in such a manner that they direct and convey the stream of cooling air into the trough-shaped depression in the top of the piston 3 controlling the discharge. The stream of cooling air is well distributed in the trough-like depression over the entire piston top. During the gas expansion, this depression brings about the further advantage that the center portion of the said depression is not any longer acted upon to any material extent by the combustion gases escaping through the discharge slots 7.

The arrangement according to the invention furthermore comprises a highly heat resistant insert 9 which forms the main combustion chamber 8 and is mounted in a housing 11 connected to the cylinder and provided with a fuel injection nozzle 10. A gradually widening passage leads from the combustion chamber 8 to the cylinder in which it ends in form of a narrow slot 12. This slot is never covered by either one of the two pistons 2 and 3 when the latter occupy their inner dead center positions.

Due to the particular design of the two piston tops, the outwardly arched piston top of the piston 2 controlling the inlet is thermally stressed higher by the flame jet entering the cylinder from the combustion chamber 8 than is the case with the inwardly arched piston top of the piston 3 controlling the gas discharge. Each heated combustion jet conveyed against the outwardly arched top of the piston 2 which heats the latter is succeeded by a cooling action of the scavenging and charging air hitting said piston top when the inlet slots 4 are opened, which scavenging and charging air is deflected by said outwardly arched piston top toward the interior of the cylinder.

From the preceding description it will be evident that the arrangement according to the invention brings about a considerable reduction in the thermal stresses acting upon the piston 3 which controls the discharge slots 7. It will also be appreciated that the depressed bottom of piston 3 is periodically cooled by the air passing through the additional cooling air inlet slots 5.

It is, of course, to be understood that the present invention is, by no means, limited to the particular construction shown in the drawings but also comprises any modifications within the scope of the appended claims.

What is claimed is:

1. In combination in a superchargeable two-stroke cycle internal combustion engine provided with air inlet slots and with discharge slots: an intake control piston reciprocably mounted in said cylinder and provided with an outwardly arched piston bottom said intake control piston being operable to control said air inlet slots, a discharge control piston reciprocably mounted in said cylinder and provided with an inwardly arched piston bottom forming a depression substantially complementary to said outwardly arched piston bottom and facing the latter, said discharge control piston being operable to control said discharge slots, said pistons being arranged as oppositely moving pistons, said cylinder also being provided with cooling air inlet slots arranged within the range of the axial extension of said discharge slots and controllable by said discharge piston, said cooling air inlet slots having their axes inclined to the axes of said discharge slots and directed into the depression formed by said inwardly arched bottom of said discharge control piston.

2. In combination in a superchargeable two-stroke cycle internal combustion engine with opposed pistons: a cylinder provided with charging air and scavenging air inlet slots and also provided with cooling air inlet slots and with gas discharge slots, a first piston reciprocably mounted in said cylinder and arranged to control said charging air and scavenging air inlet slots, the top of said first piston being arched outwardly, a second piston reciprocably mounted in said cylinder and arranged to control said cooling air inlet slots and said gas discharge slots, the top of said second piston being arched inwardly so as to form a depression substantially complementary to the outwardly arched top of said first piston and facing the latter, outlet manifold means connected to said cylinder and communicating with said gas discharge slots, said cooling air inlet slots being arranged within the longitudinal range of said gas discharge slots and being located within a section of the cylinder which is free from gas discharge slots and is located opposite said outlet manifold means, said cooling air inlet slots being inclined relative to the longitudinal axis of said cylinder in such a manner as to direct the air passing therethrough into said depression when said second piston is at least near its outer dead center position, and conduit means outside said cylinder and establishing communication between said scavenging air inlet slots and said cooling air inlet slots.

3. In combination in a superchargeable two-stroke cycle internal combustion engine with opposed pistons: a cylinder provided with charging air and scavenging air inlet slots and also provided with cooling air inlet slots and with gas discharge slots, a first piston reciprocably mounted in said cylinder and arranged to control said charging air and scavenging air inlet slots, the top of said first piston being arched outwardly, a second piston reciprocably mounted in said cylinder and arranged to control said cooling air inlet slots and said gas discharge slots, the top of said second piston being arched inwardly so as to form a depression facing said first piston top, feeding conduit means communicating with said charging and scavenging air inlet slots for feeding charging and scavenging air thereto, an additional conduit means establishing communication between said feeding conduit means and said cooling air inlet slots, said cooling air inlet slots having their extensions in longitudinal direction of said cylinder shorter than the extensions of said discharge slots in longitudinal direction of said cylinder, the arrangement being such that said cooling air inlet slots are uncovered by said second piston not earlier than said charging and scavenging air inlet slots are uncovered by said first piston but are covered by said second piston considerably earlier than said charging and scavenging air inlet slots are covered by said first piston.

References Cited in the file of this patent

UNITED STATES PATENTS

| | | |
|---|---|---|
| 1,145,820 | Summeril | July 6, 1915 |
| 1,460,474 | Bronander | July 3, 1926 |
| 1,579,664 | Scott | Apr. 6, 1926 |
| 2,067,049 | Goldberg | Jan. 5, 1937 |
| 2,119,219 | Ruth | May 31, 1938 |
| 2,354,620 | Smith | July 25, 1944 |

FOREIGN PATENTS

| | | |
|---|---|---|
| 360,496 | Great Britain | Nov. 12, 1931 |
| 358,469 | Italy | Apr. 15, 1938 |
| 899,598 | France | Aug. 28, 1944 |